UNITED STATES PATENT OFFICE.

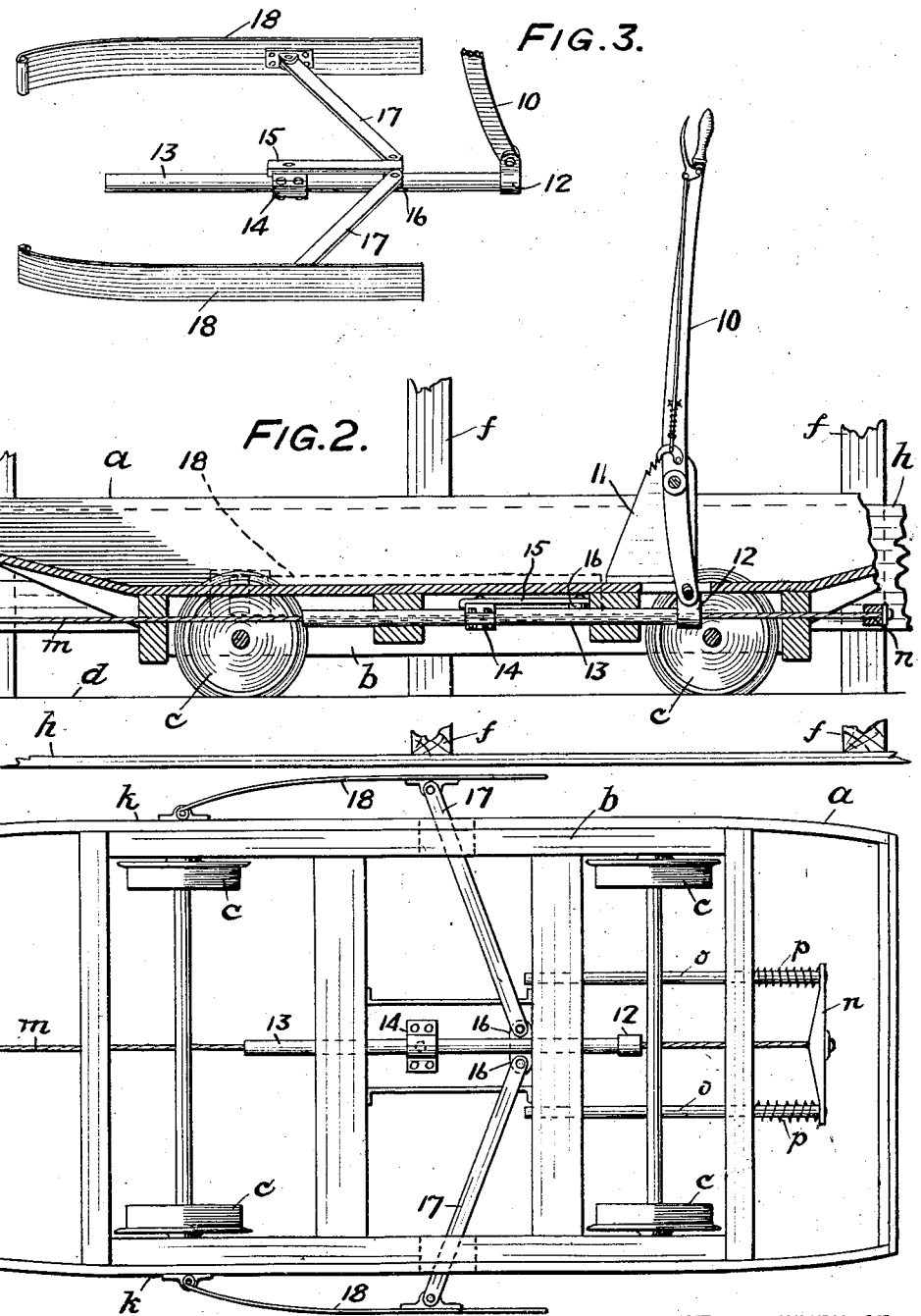

LA MARCUS A. THOMPSON, OF NEW YORK, N. Y., ASSIGNOR TO THE L. A. THOMPSON SCENIC RAILWAY COMPANY, OF NEW YORK, N. Y., A CORPORATION OF NEW JERSEY.

PLEASURE-RAILWAY.

1,070,360. Specification of Letters Patent. Patented Aug. 12, 1913.

Original application filed February 21, 1913, Serial No. 749,805. Divided and this application filed April 1, 1913. Serial No. 758,131.

*To all whom it may concern:*

Be it known that I, LA MARCUS A. THOMPSON, a citizen of the United States, residing at New York city, county of New York, and State of New York, have invented a new and useful Improvement in Pleasure-Railways, of which the following is a full, clear, and exact description, reference being had to the accompanying drawings, which form a part of this specification.

The object of my invention is to provide brake mechanism especially adapted for use on cars of pleasure railways.

In an application filed by me February 21, 1913, Serial No. 749,805, of which this application is a division, I have set forth a certain construction applicable to cars arranged as a train, the same including a non-propulsion cable extending longitudinally of all the cars and connected with the front and rear cars. The rear car of the train is shown as provided with a longitudinally extending tube through which said cable extends. This tube forms part of the specific braking mechanism which I have selected as the preferred embodiment of my present invention, although it will be understood that the invention is not limited to this or any other specific features of construction that are not specifically recited in the claims.

In the drawings: Figure 1 is an inverted plan view of a car embodying my invention. Fig. 2 is a longitudinal sectional view of the same. Fig. 3 is a perspective view of a portion of the brake mechanism.

The car body $a$ is mounted on the car truck $b$ carrying the wheels $c$. The rails $d$ are secured to the road bed at the sides of which are uprights $f$ which hold securely in position the longitudinally extending side guides $h$.

The brake-lever 10 is pivoted between its ends on a standard 11 on the car, preferably on the truck, and at its lower end is attached to a head 12 secured to the rear end of a tube 13, which tube accommodates a cable $m$, which is adapted to connect together several cars of a train in accordance with the invention set forth in my said application filed February 21, 1913. The tube 13 is slidable in the direction of its length in the cross-pieces of the truck. To the tube 13 is secured a clamp 14, to which is fixed a rearwardly extending bar 15 having ears 16, 16. To these ears are pivoted links 17, which connect the bar 15 with brake-shoes 18 pivoted at their front ends to the car, preferably to the side pieces $k$ of the car-body. By drawing back the upper end of the brake lever 10, the tube 13 and bar 15 are moved forwardly, thereby pulling forwardly the inner ends of the links 17, thereby forcing out the brake shoes 18 with a powerful pressure against the side-guides $h$.

The cable $m$ is secured to a cross-head $n$ carrying forwardly extending rods $o$, $o$, slidable in guides in the two rear cross-pieces of the truck. Coil springs $p$, $p$, surround the rods $o$, $o$, and are confined between the rear cross-piece of the truck and the cross-head $n$.

It will be observed that the braking mechanism hereinbefore described, while of great utility *per se*, also performs the function of acting as a guide for a non-propulsion car-connecting cable and thus coöperates therewith to the extent described.

The specific mechanism in which my invention is embodied in the construction shown and described, while exhibiting the preferred embodiment of my invention, may be modified, within the limits defined by the claims, without departing from my invention.

Having now fully described my invention, what I claim and desire to protect by Letters Patent is:

1. In a pleasure railway, the combination with the track and upright side-pieces extending along the track, of a car adapted to run on the track, a brake-lever mounted on the car, a pair of brake-shoes pivotally secured to the car and adapted to move outward and press against the side-pieces, a pair of laterally extending arms pivotally secured to the brake-shoes, and connecting means between the arms and the brake-lever whereby the latter may be operated to force the brake-shoes against the side-pieces.

2. In a pleasure railway, the combination with the track and upright side-pieces extending along the track, of a car adapted to run on said track, a brake-lever mounted on the car, longitudinally movable mechanism connected with and adapted to be operated by said brake-lever, a pair of laterally extending arms pivoted to said longitudinally movable mechanism, and a pair of brake-shoes pivotally secured both to the car and to the said arms and adapted to be pressed by said arms against said side-pieces.

3. In a pleasure railway, the combination with the track and upright side-pieces extending along the track, of a car adapted to run on the track, a tube longitudinally movable on the car, a cable extending through the tube, a brake-lever connected with said tube, a pair of laterally-extending arms pivotally connected with said tube, and a pair of brake-shoes connected with the car and said arms and adapted to be pressed by said arms against said side-pieces.

4. In a pleasure railway, the combination with the track and upright side-pieces extending along the track, of a car adapted to run on the track, a longitudinally movable member on the car, a brake-lever connected therewith, a bar connected to said member and extending toward said brake-lever, a pair of arms pivotally connected with said bar, and a pair of brake-shoes connected with the car and said arms and adapted to be pressed by said arms against said side pieces.

In testimony of which invention, I have hereunto set my hand, at New York, N. Y., on this 28th day of March, 1913.

LA MARCUS A. THOMPSON.

Witnesses:
A. M. BABER,
A. G. BLACKMAN.

---

Copies of this patent may be obtained for five cents each, by addressing the "Commissioner of Patents, Washington, D. C."